Dec. 15, 1970 L. SIMPSON 3,548,285

HIGH EFFICIENCY CURRENT DRIVER

Filed March 29, 1968

INVENTOR,
LEO SIMPSON

BY J. J. Smith, AGENT

Harry M. Saragovitz, Edward J. Kelly, Herbert Berl & J. C. Keppler

ATTORNEYS

United States Patent Office 3,548,285
Patented Dec. 15, 1970

1 2

3,548,285
HIGH EFFICIENCY CURRENT DRIVER

Leo Simpson, West Hempstead, N.Y., assignor, by mesne assignments, to the United States of America as represented by the Secretary of the Army Filed Mar. 29, 1968, Ser. No. 717,196
Int. Cl. H02m *1/00*
U.S. Cl. 320—1 5 Claims

ABSTRACT OF THE DISCLOSURE

This invention relates to a current driver for generating high current drive pulses through low impedance circuits. The circuit consists of two grounded cathode transistor switches, the anode of each being connected through a capacitor to opposite terminals of a transformer primary, the center tap of which is grounded. A D.C. voltage source is connected through a large inductor to two diodes, the opposite terminals of which are connected to the transistor anodes. An "I" input is connected to one switch input terminal while an "O" input is likewise connected to the other switch. The capacitors are charged during the interpulse period by the D.C. voltage source and are maintained at a voltage of twice the D.C. source voltage over extended interpulse periods by two separate D.C. sources which are connected to the anodes of the two switches through two large resistors.

An input pulse discharges the capacitors through the low impedance network comprising one-half of the center tapped transformers and the switch while the load is inductively coupled to the center tapped transformer.

BACKGROUND OF THE INVENTION

The high efficiency current driver, of the instant invention, provides the capability for generating unusually high current drive pulses through low impedance circuits, without the use of current limiting resistive elements. This results in an exceptionally high power efficiency that is unattainable with standard current drive circuits. Furthermore, by employing a novel integrating technique, the peak-current capacity of the D.C. power supply for the unit is a function of the average power delivered to the load rather than the peak power. Since this ratio is typically in the order of 1/1000, it results in a substantial simplification of the necessary D.C. power supply equipment.

The current pulses are supplied with either positive or negative polarity, with peak amplitudes up to 25 amperes, and pulse widths of approximately 1 microsecond. This capability allows the circuit to be used for extremely high speed switching applications, as will be described below. Switching speeds of a small fraction of a microsecond may readily be achieved.

The high efficiency current driver is capable of responding to low level control signals without the use of intermediate current amplification stages that are normally required to obtain the desired high current output pulses. This represents a major improvement since it eliminates the need of a substantial number of components to implement the above function, and results in a simple, compact, and highly efficient configuration.

The driver is exceptionally well suited for providing the actuating pulses for latching-type ferrite devices such as those contained in a microwave ferrite phase shifter, switches, etc. This results from the fact that an operational system, such as a phased array antenna, usually contains a large number of elements that require individual actuation, with the control information supplied from a data processing system. By use of the high efficiency current driver at each element, the system may be operated with a very high efficiency and a moderate sized D.C. power supply. Using the existing conventional current driver technique, an enormous power supply would be required with the additional problem of heating effects from the power dissipating elements, and a large volume of electronics for the current amplification stages at each element.

SUMMARY OF THE INVENTION

Essentially, the driver of the instant invention is concerned with providing high current pulses of positive and/or negative polarity as desired. The device is charged by a D.C. voltage through a high impedance resonant network and discharges through a low impedance resonant network that includes a SCR that is turned on as desired by small current gating signals. A large current pulse, on the order of 25 amps during discharge, is inductively coupled to an output winding.

The following are the major features of the above invention:

(1) Generates high current, short duration, current drive pulses through low impedance circuits. Peak current amplitudes are variable up to 25 amperes, with either positive or negative polarity. Pulse duration is typically 1 microsecond, thereby achieving switching speeds of a fraction of a microsecond.

(2) Employs non-resistive elements thereby eliminating sources of power dissipation and provides exceptionally high power efficiency that is typically in excess of 75%.

(3) Employs novel integration technique which allows the input D.C. peak power to be determined by the average power delivered to the load, rather than the *peak* power, thereby substantially reducing the size of the D.C. power source.

(4) Capable of directly responding to low level, digital-type control signals as a result of the novel application of an inherently high current gain semiconductor switching device, thereby eliminating the need for a chain of current amplification stages. This results in a unit that is physically simple and compact.

(5) Exceptionally well suited for applications requiring alternate positive and negative polarity high current drive pulses for high speed switching of latching-type ferrite devices.

BRIEF DESCRIPTION OF THE DRAWING

The exact nature of this invention as well as other features and advantages thereof will be readily apparent from consideration of the following specification relating to the annexed drawings in which.

DESCRIPTION OF THE PREFERRED EMBODIMENT

Figure 1:
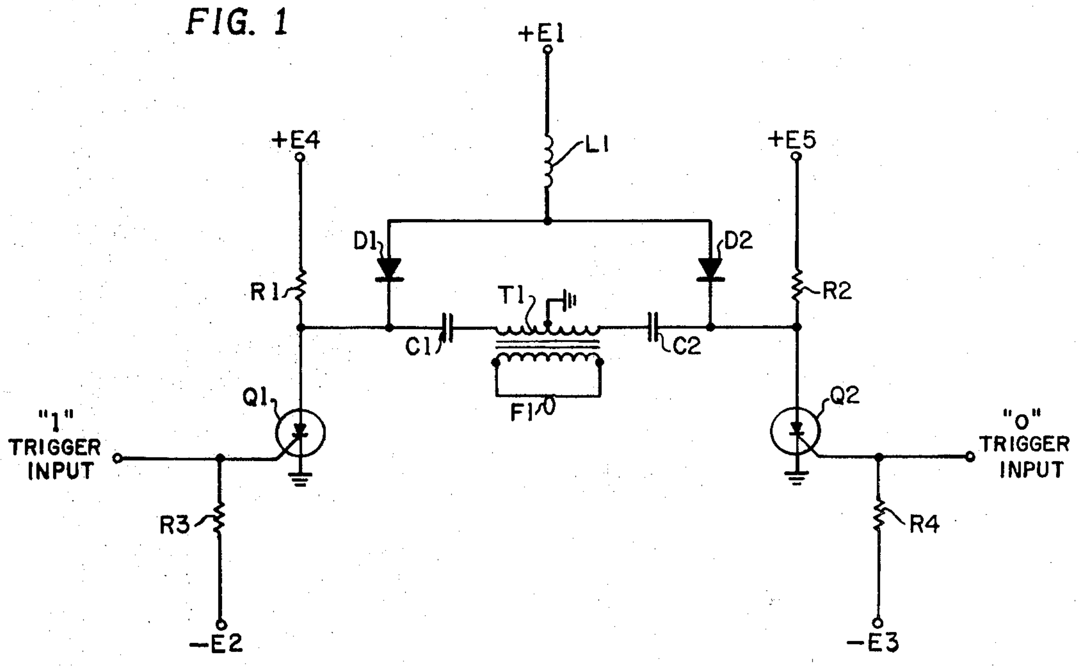
FIG. 1 shows a schematic diagram of a one-bit section of the driver circuit.

Referring now to the drawings, there is shown in FIG. 1, PNPN silicon switching devices Q1 and Q2 that are capable of switching peak current pulses of 30 amps in a fraction of a microsecond when activated at their gate inputs by a low level trigger pulse of several milliamps. The switches are normally biased off by a reverse bias E2 and E3, on the order of approximately 5 volts, and are turned on only during the switching interval. The switch presents a very low impedance (less than .25 ohm) between its anode and cathode during its "on" state, and a very high impedance (several megohms) during its "off" state. Bias sources E2 and E3 provide the necessary reverse bias to switches Q1 and Q2 through dropping resistors R3 and R4.

Capacitors C1 and C2 function as energy storage elements that are slowly charged during the interpulse period by a D.C. voltage source E1, on the order of approximately 40 volts in the preferred embodiment and then rapidly discharged during the switching interval. As shown in FIG. 1, the discharge circuit consists of a switching element, Q1 or Q2, an energy storage capacitor, C1 or C2, and one-half the primary winding of the transformer, T1. The primary winding of T1 is, therefore, symmetrically connected to two discharge circuits. The charging circuit for the energy storage capacitors C1 and C2 is provided with inductor L1 and diodes D1 and D2, and completed through the primary winding of T1. The secondary winding of T1 is connected to the wire loop linking the ferrite bit F1.

Figure 2:
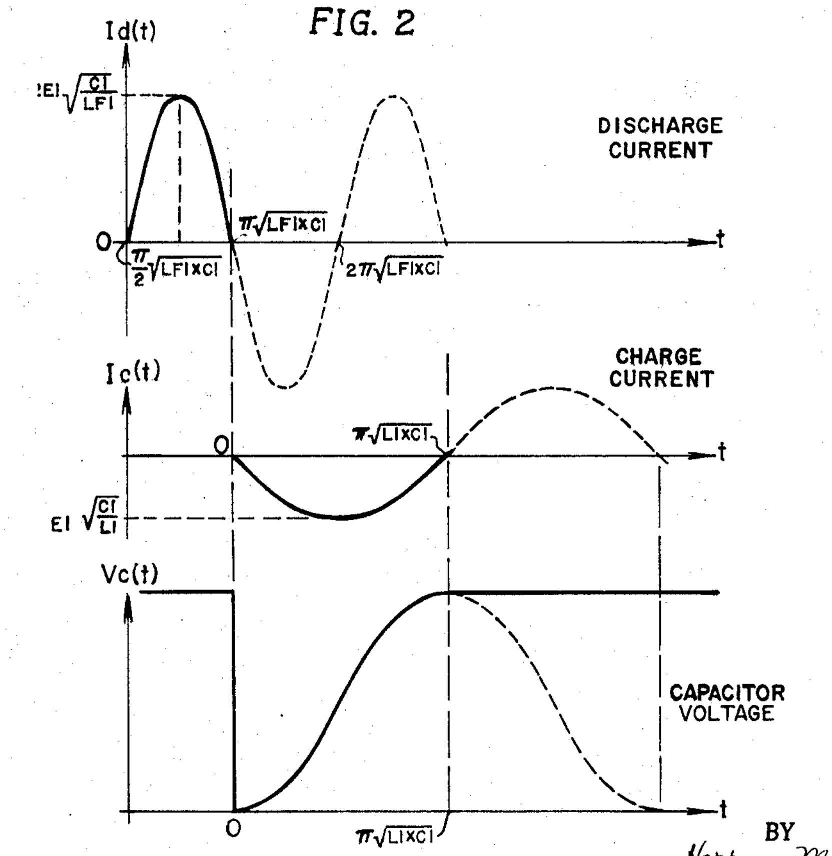
FIG. 2 shows various current and voltage waveforms.

The circuit functions as follows: Consider initially C1 and C2 charged up to a voltage $Vc$ prior to the commencement of a switching interval. For a binary "1" control signal input, Q1 is triggered on while Q2 remains off. A low impedance discharge path is provided for C1 through Q1 and half the primary winding of T1. The inductive ferrite bit F1 load impedance is reflected across the transformer T1 and effectively placed in series with C1 forming an oscillatory L-C circuit with negligible damping. A sinusoidal current waveform, $Id(t)$ as shown in FIG. 2 is set up through the discharge circuit with:

$$Id(t)=Vc\sqrt{\frac{C1}{LF1}}\sin\left(\frac{C1}{\sqrt{LF1\cdot C1}}\right)t$$

where LF1 is the reflected inductance of the ferrite loop, the time, $t$, is referenced to the commencement of the switching interval and $Vc$ is the voltage across capacitor C1 or C2. As shown in FIG. 2, after a time interval, $t$, equal to $\pi\sqrt{LF1\cdot C1}$, the current waveform has completed one-half cycle and commences to revise its polarity. This current reversal causes the PNPN switch Q1 to be rapidly switched off as a result of the elimination of its holding current, thereby interrupting the low impedance discharge path. At this point, diode D1 is forward biased and the charging inductance, L1 is placed in series with C1 and LF1, thereby forming a new L-C oscillating circuit, with a charging current $Ic(t)$ equal to:

$$Ic(t)=-E1\sqrt{\frac{C1}{L1}}\sin\left(\frac{1}{\sqrt{L1\cdot C1}}\right)t$$

as shown in FIG. 2, where E1 is the supply voltage. With L1 selected much larger than LF1 (greater than 1,000 to 1), the amplitude of the discharge current will be substantially larger than the charge current, and the current waveform through the primary winding section is effectively a sinusoidal shaped current pulse of amplitude $$E1\sqrt{\frac{C1}{L1}}$$

as shown in FIG. 2. This current pulse is reflected across the transformer, T1, and supplied to the ferrite loop.

With a binary "0" input signal, Q2 is caused to switch on and, in an identical manner as described above, generates a current pulse of amplitude $$E2\sqrt{\frac{C2}{L1}}$$

through the other half of the primary winding of T1. This pulse is then transferred to the ferrite loop with opposite polarity of the previously described pulse. In this manner, the driver circuit converts the binary "1" and "0" control signals to high current positive and negative polarity drive pulses.

Assuming the elements of the circuit are selected to obtain the required amplitude of the drive current pulse, the ferrite will be driven to a selected magnetization level at the peak of the pulse, which occurs at a time $$\frac{\pi}{2}\sqrt{LF1\cdot C1}$$

after the commencement of switching and, therefore, represents the switching time interval. Immediately following this time interval, the charge cycle commences.

The voltage waveform across the capacitor during the charge cycle is:

$$Vc(t)=E1\left(1-\cos\frac{1}{\sqrt{L1\cdot C1}}\right)t$$

This waveform commences at zero volts and reaches a maximum after a time interval $\pi\sqrt{L1\cdot C1}$ as shown in FIG. 2. Since the current waveform $Ic(t)$ passes through the zero axis at $\pi\sqrt{LF1\cdot C1}$ and attempts to go negative, diode D1 is reverse biased and interrupts the charging circuit. The voltage across the capacitor, $Vc$ is, therefore, maintained at a value equal to 2E1 after the charge time interval. The capacitor will discharge very slowly through the high impedance path of the reversed biased diode, switch and its own parallel impedance. To maintain the capacitor voltage at a value of 2E1 over especially long interpulse periods, the capacitor is connected through large resistors R1 and R2, and to voltage sources E4 and E5 which compensates for the leakage currents of the circuit and are approximately twice the value of source E1. These resistors insure that the capacitors C1 and C2 will always be charged up to a voltage 2E1 prior to the switch interval, independent of the length of the interpulse period and, therefore, deliver fixed amplitude current pulses to ferrite load. Although in the absence of these resistors R1 and R2, the capacitors C1 and C2 can at most discharge from a voltage 2E1 to the supply voltage E1 (at which point the diode in the charging circuit becomes forward biased), the resultant amplitude of the current drive pulses will vary from their maximum value for very short interpulse periods to half their maximum value for sufficiently long interpulse periods. The addition of the leakage charging resistors R1 and R2 eliminates this possibility.

By using an inductive charging technique rather than resistive charging, a major source of power dissipation is eliminated (approximately one-half the total power), and the sources of power dissipation are limited to the forward biased silicon switches and diodes, the equivalent series resistance of the charging capacitors and inductors, the leakage losses, and the hysteresis losses of the drive transformer and ferrite bits. These power losses are sufficiently low to maintain the overall efficiency above 75%.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A high efficiency current driver comprising:
a high impedance resonant charging circuit including capacitors connected to opposite terminals of a transformer primary, the center tap of which is grounded, and a high impedance inductor connected to two diodes and to said capacitors;
a low impedance resonant discharging circuit for discharging said capacitors;
switch means in said discharge circuit for controlling said discharge circuit, said switch means comprising two silicon controlled rectifiers, each having cathode, gate, and anode connections, the anode of each rectifier being connected to one of said capactors; and
transformer inductive coupling means for coupling said discharging circuit through said transformer primary to a load.

2. A high efficiency current driver according to claim 1, wherein:
said charging circuit further includes at least two equal and separate sources of direct current power connected to said anodes.

3. A current driver comprising:
two grounded cathode transistor switches having conducting and non-conducting states;
a capacitor connected to the anode of each of said transistor switches;

a center-tapped transformer connected to each of said capacitors with said center-tap being grounded thereby forming a resonant discharge circuit with said switches and said capacitors;

a first direct current voltage means connected to the anode of each of said transistor switches and including two diodes connected in parallel to a relatively large inductor in such a manner as to form a resonant charging circuit thereby charging said capacitors when said switches are in said non-conducting states;

bias means connected to the gate of each said switch;

trigger input means connected to the gate of each of said switches to cause said switch to shift to its conducting state; and output means inductively coupled to said transformer.

4. A current driver according to claim 3, and further comprising:

a second direct current voltage source means connected to the anode of each of said transistor switches to maintain the charge on said capacitors over prolonged periods when said transistor switches are in a non-conducting state.

5. A high efficiency driver for producing large current pulses, comprising:

a high impedance resonant charging circuit including a large inductance connected to two diodes, said diodes being connected in parallel to two capacitors, said capacitors being connected to opposite terminals of a grounded center tap transformer;

a low impedance resonant discharge circuit comprising said transformer, capacitors, and two grounded cathode silicon controlled rectifiers;

D.C. supply means for charging said capacitors and for maintaining said capacitors at a constant voltage after said capacitors are initially charged; and output means for inductively coupling said transformer to a load whereby an input pulse applied to one of said rectifiers causes said one rectifier to close said resonant discharge circuit thereby discharging one of said capacitors and inducing a large current pulse in said output means.

References Cited

UNITED STATES PATENTS 3,371,261 2/1968 Hull et al. ----------- 320—1X

TERRELL W. FEARS, Primary Examiner